Jan. 31, 1967  A. WINTER IV., ET AL  3,301,376
CASING MACHINE
Filed Dec. 2, 1964  9 Sheets-Sheet 1

INVENTORS.
ALPHEUS WINTER IV
ROBERT J. DORAN
FREDERICK R. MARINDIN
JOSEPH F. PANE
BY
ATTORNEY.

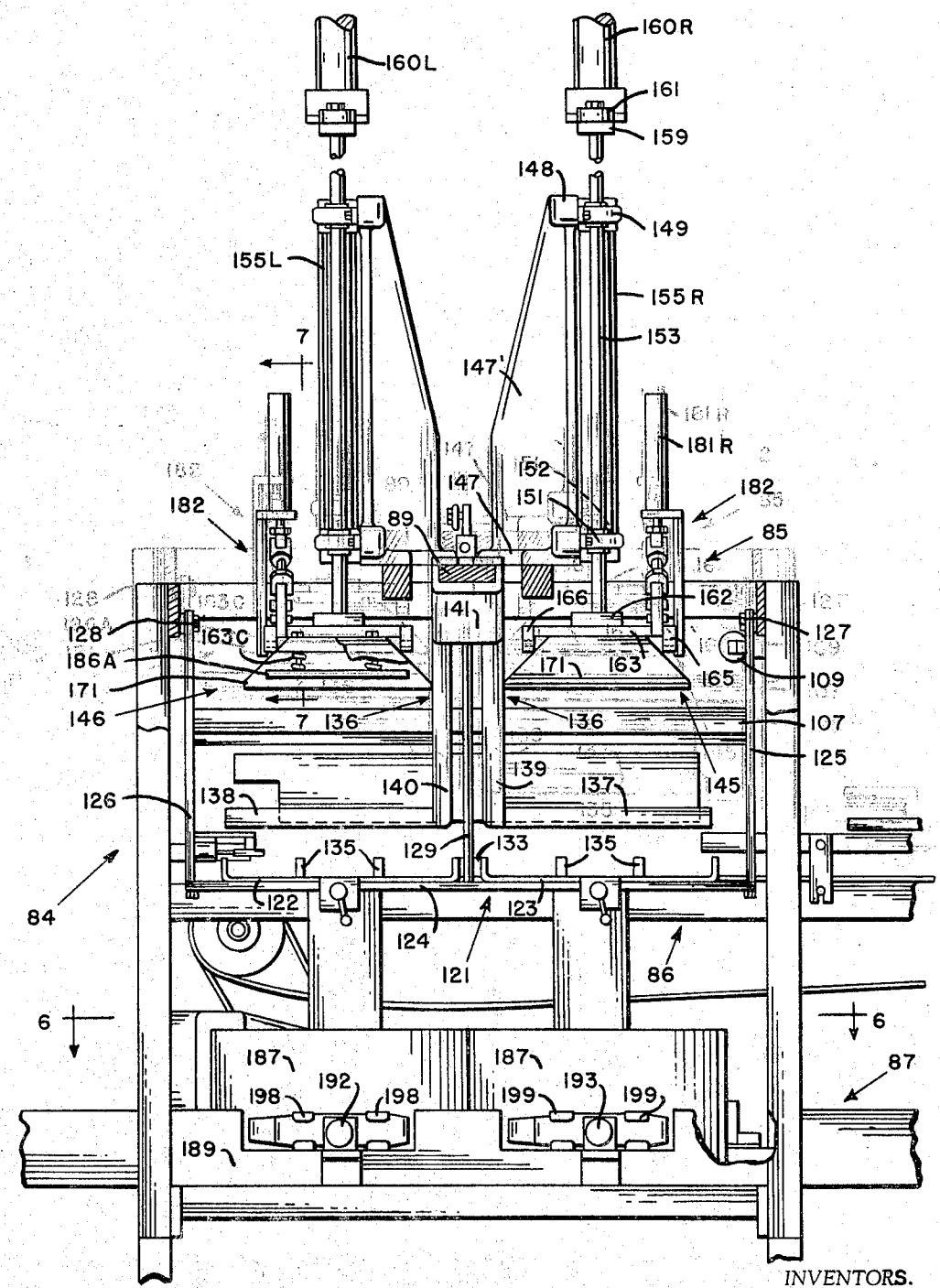
FIG. 2
INVENTORS.
ALPHEUS WINTER IV
ROBERT J. DORAN
FREDERICK R. MARINDIN
JOSEPH F. PANE
BY 
ATTORNEY

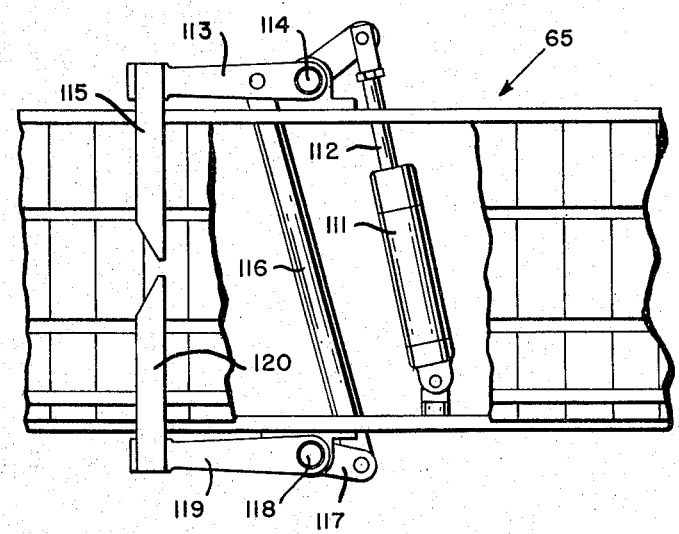
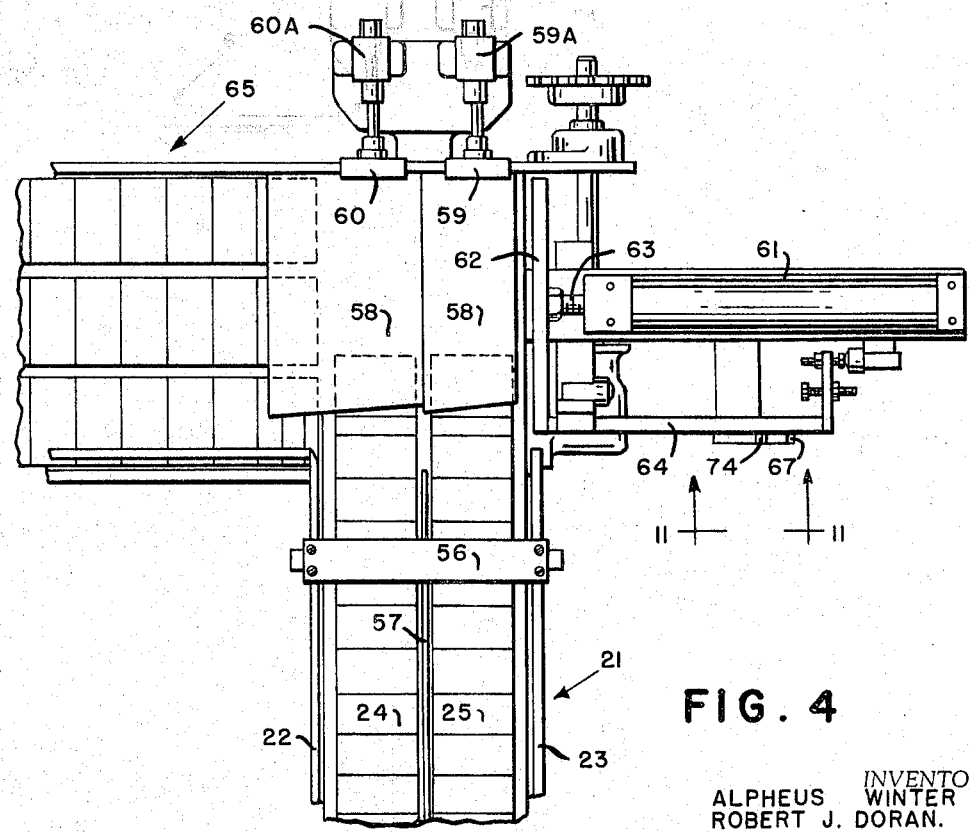
FIG. 5
FIG. 4
INVENTORS.
ALPHEUS WINTER IV
ROBERT J. DORAN.
FREDERICK R. MARINDIN
JOSEPH F. PANE
BY
ATTORNEY.

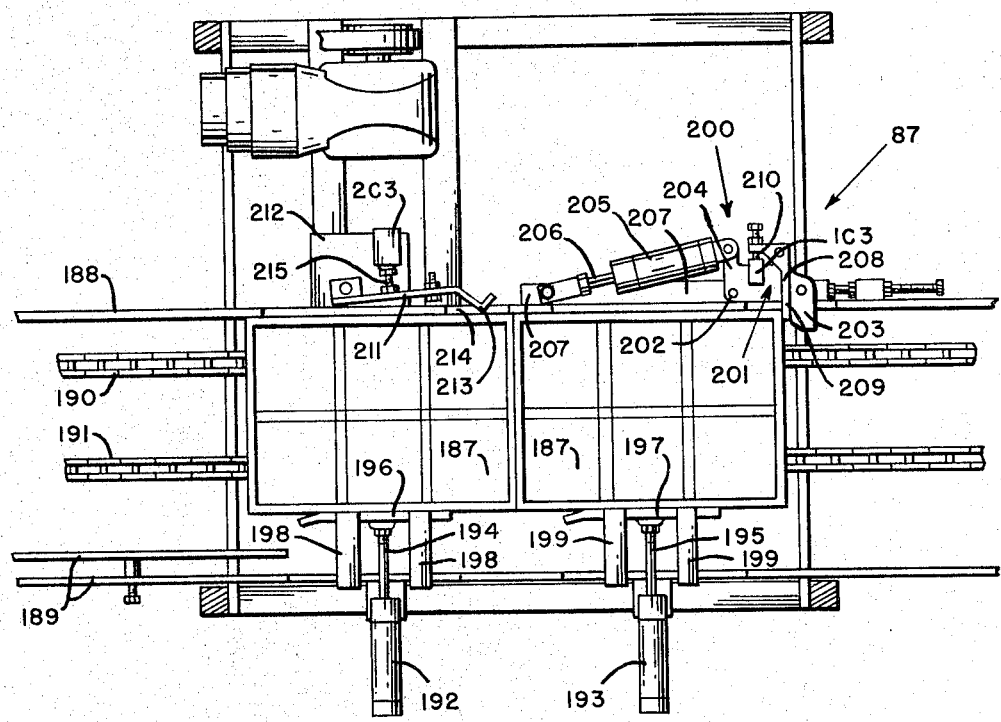
FIG. 6
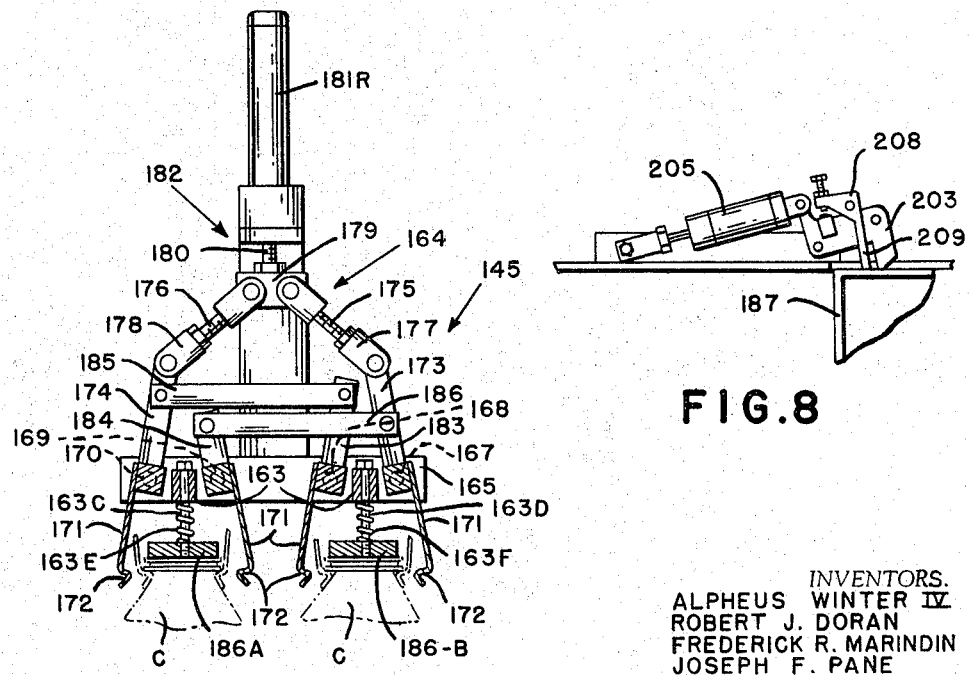
FIG. 7
FIG. 8

INVENTORS.
ALPHEUS WINTER IV
ROBERT J. DORAN
FREDERICK R. MARINDIN
JOSEPH F. PANE

INVENTORS.
ALPHEUS WINTER IV
ROBERT J. DORAN
FREDERICK R. MARINDIN
JOSEPH F. PANE

INVENTORS.
ALPHEUS WINTER IV
ROBERT J. DORAN
FREDERICK R. MARINDIN
JOSEPH F. PANE
ATTORNEY.

3,301,376
CASING MACHINE

Alpheus Winter IV, Fairfield, Robert J. Doran, Danbury, Frederick R. Marindin, Woodbury, and Joseph F. Pane, Danbury, Conn., assignors to Windor Incorporated, Danbury, Conn., a corporation of Connecticut
Filed Dec. 2, 1964, Ser. No. 415,355
6 Claims. (Cl. 198—31)

This invention relates to the casing of containers and particularly to an improved caser for containers of liquids such as milk and the like.

Casers for milk containers have heretofore been provided. However, there is a continual demand for increased speed in the casing of filled milk bottles and the like. Usually, a single-line conveyor removes filled milk containers from a milk dispensing machine and delivers them to a caser. Many attempts have been made to speed up the action of such conveyors and machines, but limitations have restricted the speed of handling such containers, particularly if the apparatus is required to handle filled milk bottles.

The principal object of this invention is to provide a caser for filled milk bottles and the like that will have an increased casing rate without impairing the containers.

Another object of the invention is to provide such a caser in which a single-line conveyor is converted to a multiple, parallel-line conveyor, and thence to another multiple-line conveyor at an angle to that of the multiple, parallel-line conveyor.

Still another object of the invention is to provide such a caser in which the containers in moving from a single-line to a multiple, parallel-line conveyor do so without overlap and with the multiple lines maintained intact.

Another object of the invention is to provide such a caser in which the feeding of the bottles from the single-line to the multiple, parallel-line conveyor is such that alternately each parallel line is periodically fed a predetermined number of bottles.

Still another object of the invention is to provide such a caser in which a dead plate receives and marshalls the containers from the multiple, parallel-line conveyor, and from which plate the marshalled containers are pushed onto a right angular conveyor.

A further object of the invention is to provide such a caser in which a predetermined quantity of containers is collected on the right angular conveyor and released periodically to be fed as a unit into a casing frame.

A still further object of the invention is to provide such a caser in which the unit of bottles (usually enough to fill one or more crates) is pushed onto a table beneath a vertically reciprocable gripping head.

Another object of the invention is to provide such a caser in which the head is normally located above the tops of the containers and the head, upon descending, grips the containers, whereupon the table moves from beneath the load of gripped bottles which are then moved downwardly.

Another object of the invention is to provide such a caser in which the gripping means in the head incorporates means for contacting the tops of the bottles to prevent their swaying when supported by the grippers.

Still another object of the invention is to provide such a caser in which means is provided for locating the rows of bottles on a table evenly under the grippers of the head such that the grippers move the bottles in each row a constant distance.

Another object of the invention is to provide such a caser in which empty cases are conveyed beneath the reciprocating head mechanism to receive the bottles.

Still another object of the invention is to provide a fluid-operated circuit for sequentially initiating the operation of the various components of the caser to produce the rapid casing of milk containers and the like.

In one aspect of the invention, a single line of milk containers or the like may be fed to a point where a pivotally mounted gate is located. The gate may include a telescoping front portion that straddles the container. The telescoping portion is adapted to move from a retracted position with the gate on one side of a double-line conveyor supplied from the single-line conveyor, to an extended position at the center of the double-line conveyor, thence to a retracted position on the other side of the double-line conveyor. It has been found that the gate action without the telescoping end portion causes improper movement of the containers onto the double-line conveyor. In the first place, if the gate is moved too slowly, it will adversely affect the position of the containers as they are directed to each of the lines of the double conveyor. In other words, as the gate moves the containers across the midpoint of the double-line conveyor, one side of the gate will strike a trailing edge of a container, causing the latter to turn. This is not too serious with containers of square cross section, but with containers having a rectangular cross section, such as half-gallon milk bottles, the containers will be turned so that their longitudinal cross sectional axes will lie transversely to the line of the conveyor and will be in an improper position. If the gate is oscillated fast enough to avoid this turning action, it will cause breakage of the containers if glass, and in any instance will cause the containers to bounce off the guide walls on each side of the double-line conveyor, causing misplacing of the containers on the double-line conveyor. The telescoping end portion of the gate permits maximum gate speed with proper positioning of the containers on each of the lines of the double-line conveyor.

In still another aspect of the invention, the gate may be oscillated by a fluid-operated arrangement that actuates a cam for extending and retracting the telescoping end portion in proper relation.

In a further aspect of the invention, a presettable counting means may be provided for oscillating the gate, and it may take the form of a photoelectric system in which the passage of each container intercepts a light beam until a predetermined number of containers has passed through the gate.

In a still further aspect of the invention, the double-line conveyor continues to a point where the containers are marshalled, and after a predetermined number in both lines has accumulated, a pusher transfers the group of marshalled bottles onto a three-line conveyor moving, at right angles to the double-line conveyor, the marshalled group of containers into a frame of a casing machine.

In another aspect of the invention, a second marshalling device is provided along the three-line conveyor for marshalling the containers moving therealong by stopping their forward movement until one or more case loads have collected on the three-line conveyor, depending upon the number of heads in the casing machine. When the preceding case load or loads of bottles have cleared the inlet to the casing machine, the second marshalling means is released, permitting the containers in case load lots to pass into the framework of the casing machine where they are stopped in front of a pusher arranged at right angles to the three-line conveyor.

In still another aspect of the invention, at the appropriate time the last-mentioned pusher transfers the case load or loads of containers onto pivotally mounted table means beneath vertically reciprocable gripping head means that normally lie a substantial distance above the tops of the containers. The table means includes spacer bars for separating the rows of bottles in one direction on the table means at distances corresponding to the spacing of the containers within cases for receiving said containers. When the containers have been located on the table means, the gripping head or heads descend to a point where they can grip the top extremities of the containers, causing spacing of the containers at right angles to the spacing effected by the spacers on the table means. There may be provided plate means within each gripping means on the head, which plate means contacts the tops of the containers to prevent their swaying when supported by the head. The head or heads are then raised and the table means is then pivoted from beneath the containers, leaving the latter suspended from the gripping head means and in spaced relation in two directions at right angles to each other corresponding to the spacing which the containers are to assume in the case or cases. The gripping head is then caused to descend to deposit the containers within cases, after which it rises to a point substantially above the tops of the next load of containers to be transferred onto the pivotally mounted table means.

In a further aspect of the invention, a case conveyor may be provided that delivers one or more cases simultaneously beneath one or more vertically reciprocable gripping head means and may include case rejecting means for damaged or misaligned cases.

In still another aspect of the invention, a fluid-operated circuit may be provided for causing the various components of the system to function in a desired sequential order.

The above, other objects and novel features of the invention will become apparent from the following specification and accompanying drawings which are merely exemplary.

In the drawings:

FIG. 2 is an elevational view looking in the direction of the arrows along line 2—2 of FIG. 1;

FIG. 4 is a plan view looking in the direction of the arrows along line 4—4 of FIG. 1;

FIG. 5 is a plan view looking in the direction of the arrows along line 5—5 of FIG. 1;

FIG. 6 is a plan view taken substantially along line 6—6 of FIG. 2;

FIG. 7 is a sectional view taken substantially along line 7—7 of FIG. 2;

FIG. 8 is a view of a portion of the apparatus shown in FIG. 6 in a different position;

Figure 1:
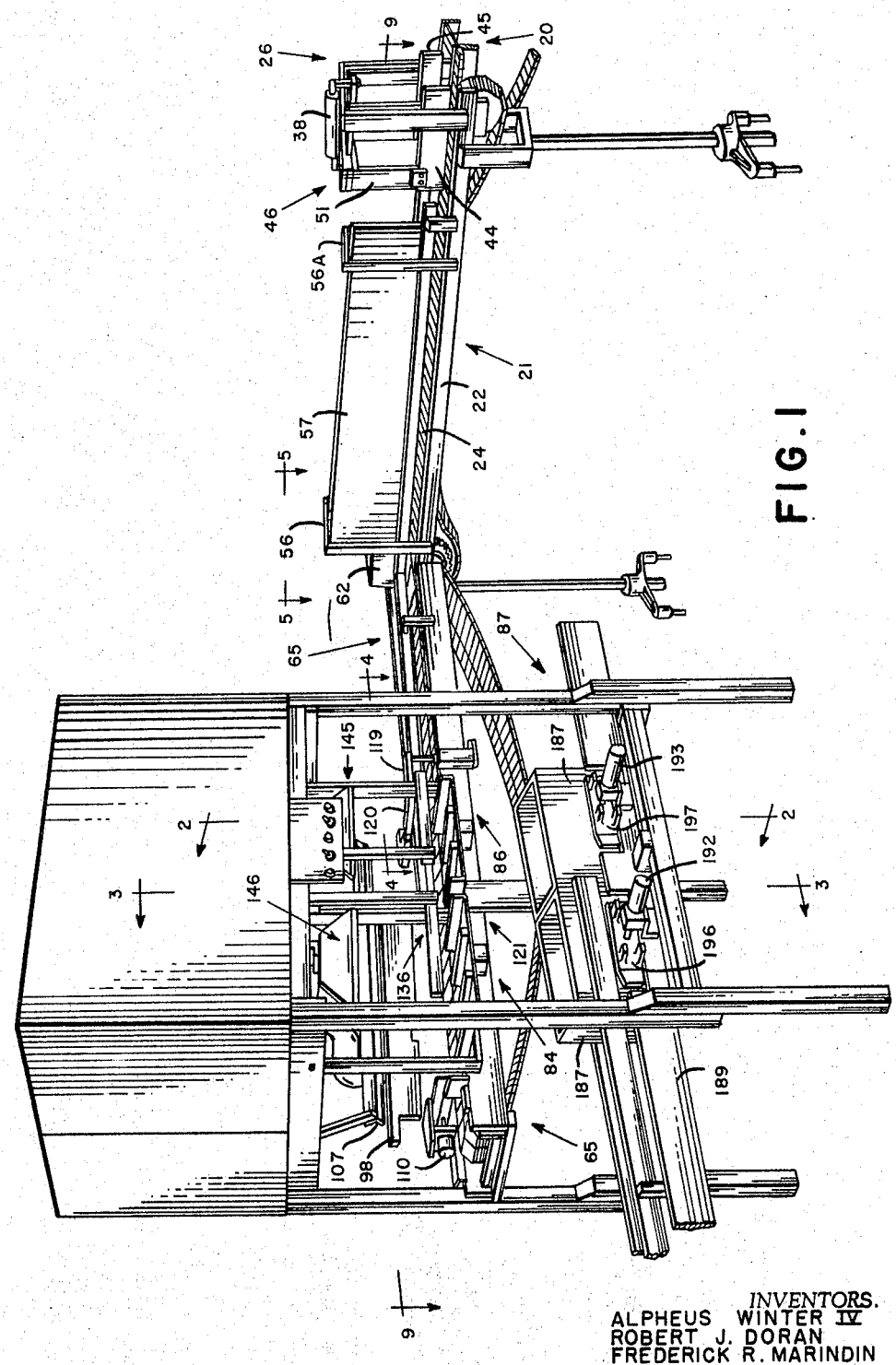
FIG. 1 is a perspective view of a container casing apparatus to which the principles of the invention have been applied.

Referring to the drawings, and particularly to FIGS. 1, 9, 9A and 10, the principles of the invention are shown as applied to a casing system for containers. Although the principles of the invention are applicable to any type of container, they are shown and will be described as applied to caser apparatus for handling glass milk bottles of the quart and half-gallon size although it is to be understood that other sized bottles can with equal facility be handled. The system may comprise a single-line conveyor 20 which carries filled milk bottles from a milk bottle filling machine (not shown). At the leading end of conveyor 20, the entrance end of a two-line conveyor 21 may be provided. Conveyor 21 may include side plates 22 and 23 between which two endless belts 24 and 25, in the embodiment disclosed, are closely spaced in parallel arrangement.

Figure 9:
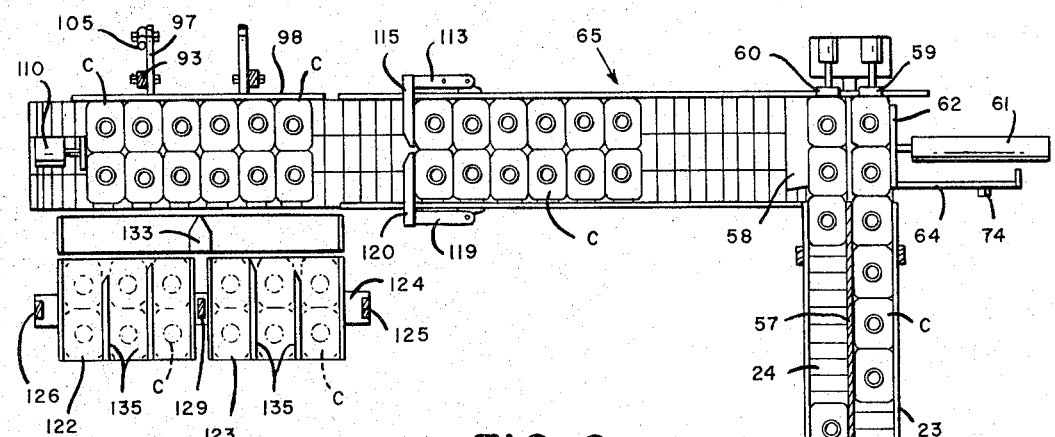
FIG. 9 is a plan view looking in the direction of the arrows along line 9—9 of FIG. 1.
Figure 9A:
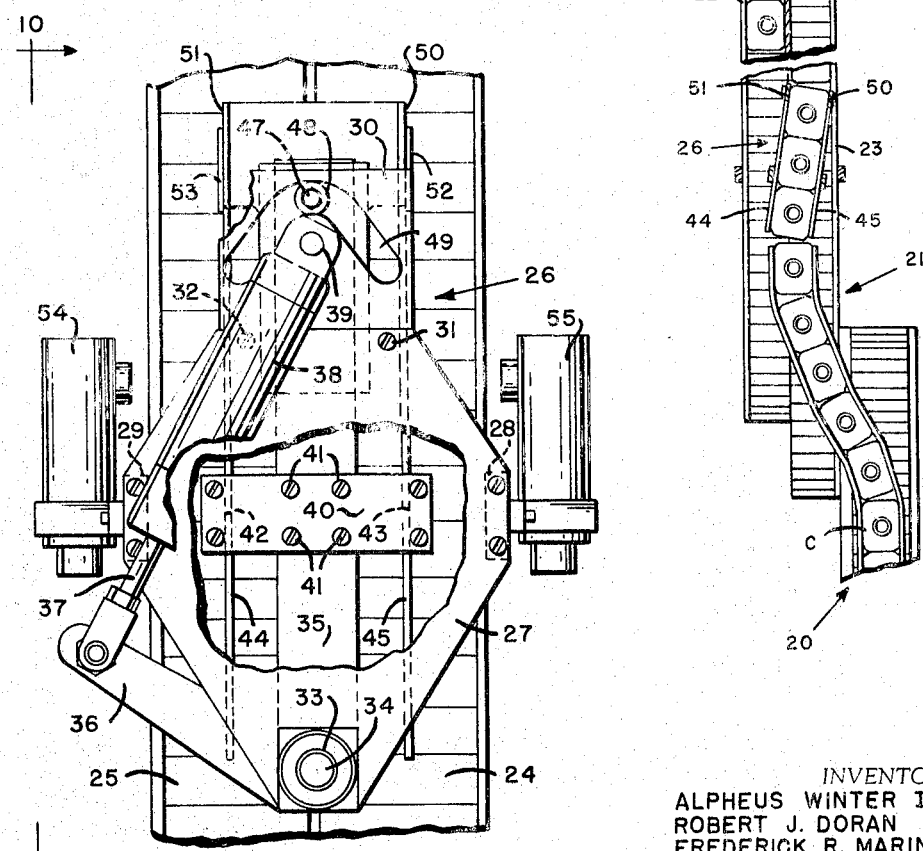
FIG. 9A is an enlarged view of the alternating gate mechanism shown in FIG. 1 but not shown in FIG. 9.
Figure 10:
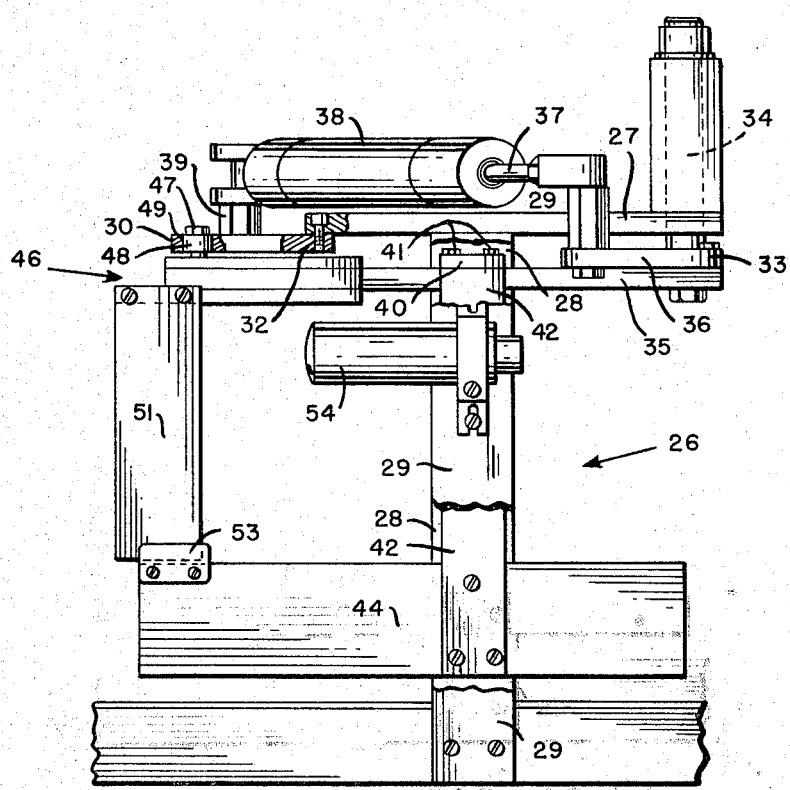
FIG. 10 is an elevational view taken along line 10—10 of FIG. 9A.

In order to supply the belts 24 and 25 with bottles from single-line conveyor 20, a transfer gate 26 (FIG. 9A) is located between the exit end of conveyor 20 and the entrance end of conveyor 21. Referring to FIGS. 9A and 10, the transfer gate 26 may comprise a plate 27 that is mounted rigidly at the top of spaced uprights 28 and 29 that are fixed at their bottom ends to the framework supporting conveyors 20 and 21.

The fixed plate 27 fixedly supports at one of its ends a cam plate 30 by means of bolts 31 and 32, and a bearing 33 at its other end. Bearing 33 journals a vertical shaft 34 with a bar 35 fixed thereto. Bar 35 extends forwardly of the gate mechanism beneath and beyond the cam plate 30. A crank arm 36 has one of its ends connected to shaft 34 and its other end connected to a piston rod 37, the piston of which is mounted for reciprocation in a cylinder 38. The opposite end of cylinder 38 is pivotally connected by a pin 39 to the stationary cam plate 30. From the foregoing it is evident that reciprocation of the piston within cylinder 38 will oscillate shaft 34 and with it, bar 35.

A cross plate 40 is attached to bar 35 by screws 41, and it has fixed to its opposite ends depending bars 42 and 43. Gate plates 44 and 45 are fixed to the lower ends of bars 42 and 43. They are spaced apart in order to allow milk bottles to pass. Oscillation of bar 35 therefore oscillates gate plates 44 and 45.

A cross head bearing 46 is slidingly mounted on the forward end of bar 35. The bearing 46 supports a pin 47 on which a roller 48 is mounted. The roller 48 rides in a cam slot 49 in stationary cam plate 30. Guide plates 50 and 51 are fixed to and depend from opposite sides of cross head bearing 46 and lie in the same vertical plane as gate plates 44 and 45. Guide bearings 52 and 53 on the forward ends of plates 44 and 45 guide the lower ends of plates 50 and 51.

Cam slot 49 is of such configuration that upon oscillation of bar 35 by cylinder 38, cross head bearing 46 and with it guide plates 50, 51 move from a retracted position at one limit of oscillatable motion of bar 35 to an extended position midway of the oscillation of bar 35, thence to a retracted position at the other limit of oscillatable motion of bar 35.

A counting device is provided for directing a predetermined number of bottles alternately first to belt 25 of conveyor 21 and then to belt 24. This counting means, in the embodiment disclosed, includes a light source 54 adjustably mounted on upright 29 and a photoelectric cell 55 adjustably mounted on upright 28 such that the beam of light from source 54 passes across the gate mechanism at a height to be intercepted by the passing of each bottle through the gate mechanism. A counter of commercial design is wired into the circuit of cell 55 and is set so that upon the interception of the light beam by every third bottle in the single row of bottles, a valve will be operated to admit pressure fluid to cylinder 38 to effect oscillation of bar 35 to direct the next succeeding three bottles to the belt 24 or 25, depending upon to which belt the last three bottles were directed.

Referring to FIG. 4, bridges 56, 56A straddle conveyor 21 and support a vertical plate 57 that is held between the belts 24 and 25 to ensure proper alignment of the bottles as they reach the exit end of conveyor 21. In order to shorten the length of conveyor 21, a dead plate 58 is located at its exit end and is arranged to receive the bottles in two rows from conveyor 21. It is preferable that the row from belt 25 pass onto plate 58 before the row from belt 24, the former acting to guide the latter into proper position.

Separate valve actuators 59 and 60 that are connected to dash pots 59A and 60A are located at the end of plate 58, and the valves thereof are connected in series in a pneumatic circuit as will appear hereinafter. The dash pots 59A, 60A soften the stopping action of the containers on dead plate 58. Both actuators 59 and 60 will be depressed when two rows of three each of quart bottles, or two rows of two each of half-gallon bottles, are properly located on plate 58.

When plate 58 is filled and both actuators 59, 60 are depressed, pressure fluid is admitted to the rear end of a cylinder 61, the piston therein being connected to a pusher plate 62 by a rod 63. The pusher plate 62 includes a bar 64 at its end nearest conveyor 21 for the purpose of intercepting the flow of bottles from conveyor 21 during the reciprocative stroke of plate 62.

It is desirable that plate 62 move enough bottles onto an accumulating conveyor 65 to fill two cases at a time. Thus, if quarts are being run, four reciprocations of plate 62 with two rows of three bottles each in front of it will transfer 24 quart bottles onto conveyor 65. And, if half-gallon bottles are being run, three reciprocations of plate 62 with two rows of two bottles each in front of it will transfer twelve half-gallon bottles onto conveyor 65.

Figure 11:
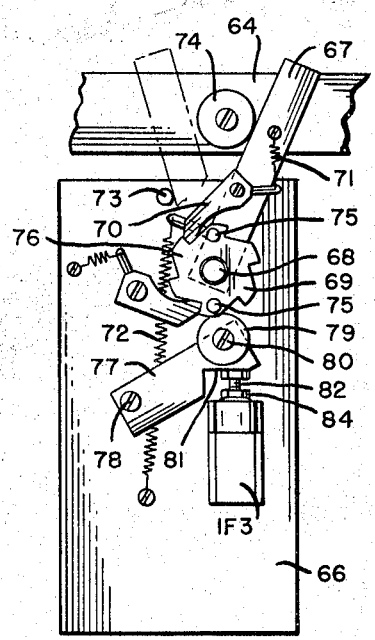
FIG. 11 is an elevational view taken substantially along line 11—11 of FIG. 4.

As will appear hereinafter, it is desirable to stop the pusher plate 62 after a load for two cases has been transferred onto conveyor 65 (when a two-headed caser is provided) and to restart it after the load on conveyor 65 passes on its way to the casing machine. In order to effect this, an indexing mechanism has been provided. Referring to FIGS. 4 and 11, a plate 66 is mounted on the framework beneath arm 64. It may have a rod 67 mounted on a pivot pin 68, on which pin a ratchet wheel 69 may be journaled. A pawl 70, pivotally mounted on rod 67, is resiliently urged into cooperating relation with the teeth of ratchet 69 by a spring 71. A spring 72 having one end connected to rod 67 and the other end connected to plate 66 acts to move rod 67 counterclockwise an amount to rotate ratchet 69 one tooth, its counterclockwise movement being limited by an abutment 73 on plate 66.

A roll 74 on the bar 64 is adapted to move the rod 67 clockwise when the plate 62 is retracted. Each time plate 62 and bar 64 move leftwardly (FIG. 4), roll 74 moves away from rod 67, and spring 72 moves rod 67 counterclockwise until it hits stop 73, causing pawl 70 to index ratchet 69 one tooth.

Ratchet 69 may include pins 75 at the location of certain of the teeth 76 thereon. Thus, when quart containers are being handled, the ratchet 69 will have eight teeth with a pin 75 at two diametrically opposed teeth 76 so that each pin will become effective after every fourth reciprocation of plate 62. This means that two rows of three containers each will be advanced onto conveyor 65 for each tooth 76 of ratchet 69 when one of the pins 75 becomes effective, at which time there will be 24 quart bottles pushed onto conveyor 65, twelve for each head of a twin-head caser. When half-gallons are to be cased, the ratchet 69 will have six teeth with a pin 75 at two diametrically opposed teeth; thus a pin becomes effective after every third reciprocation of pusher plate 62.

A bar 77 pivoted at 78 to plate 66 journals a roll 79 on a pin 80. The roll 79 is in line with each pin 75 when it becomes effective, and the bar 77 includes a surface 81 that cooperates with a stem 82 of a valve 1F3. Adjusting nut means 84 may be provided to produce the exact cooperation necessary between roll 79 and stem 82. As will be explained later, operation of the valve 1F3 will stop the reciprocation of plate 62 until the twelve half-gallon bottles on conveyor 65 have moved from a marshalling or accumulating point on conveyor 65 toward the casing machine.

Figures 3, 3A:
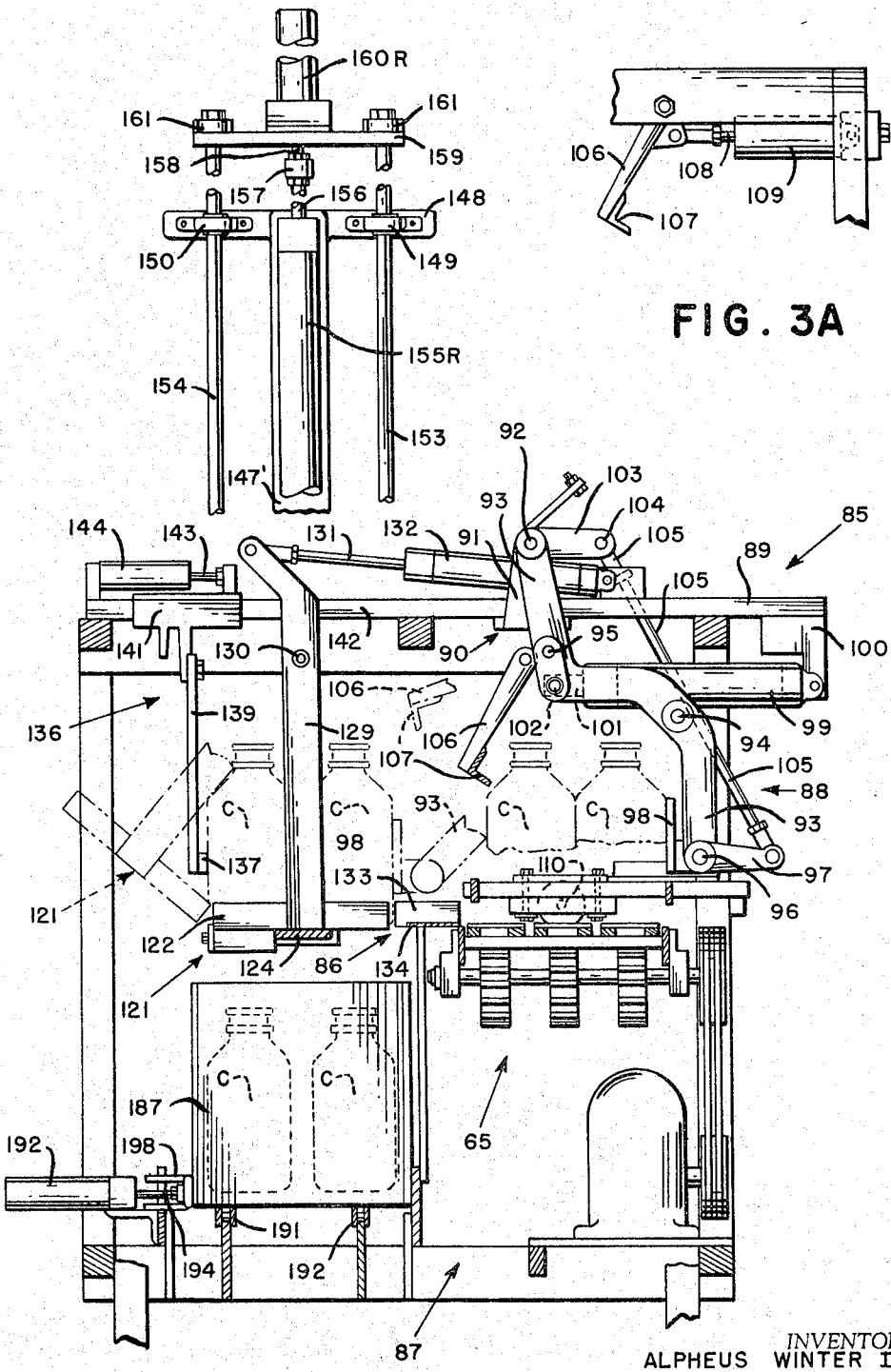
FIG. 3 is an elevational view looking in the direction of the arrows along line 3—3 of FIG. 1.
FIG. 3A is a detail of FIG. 3.

Referring to FIGS. 1, 2 and 3, the casing machine may comprise a frame 84 composed of top, intermediate and lower platforms 85, 86 and 87, respectively. The intermediate platform 86 may be at the same elevation as conveyor 65, which latter feeds the two case loads of containers into frame 84 in front of a pusher 88.

The upper platform 85 may include a stationary plate member 89 to which a bracket 90 is fixed. The bracket 90 may include spaced, parallel uprights 91 on each side of the member 89 that journals a shaft 92. Identical levers 93 are journaled on shaft 92 at each end thereof and are fixed to each other by tie rods 94 and 95. The lower end of levers 93 support a fixed shaft 96 on which spaced levers 97 (only one being shown) are journaled. The levers 97 are connected to a pusher plate 98.

Oscillation of links or levers 93 and pusher plate 98 is effected by a cylinder 99 having its blank end fixed to a bracket 100 depending from plate 89. The piston rod 101 of the piston within cylinder 99 is pivotally connected to a bar 102 extending between links 93.

In order to maintain pusher plate 98 vertical during the oscillation of links 93, a link 103 is mounted on one of the uprights 91 and is fixed horizontally. Its free end 104 pivotally supports one end of a rod 105, the opposite end of which is pivotally connected to the end of link 97 opposite that connected to pusher plate 98. The lengths of links 103 and 97 are identical so that as link 93 pivots about shaft 92, rod 105 pivots about end 104, maintaining link 97 horizontal during such pivotal movement, hence maintaining plate 98 vertical.

As the containers C move along conveyor 65 into the frame of the casing machine and at the elevation of the platform 86, means is provided for preventing the containers from walking out of line due to the continued motion of the conveyor 65 beneath said containers. To this end, a lever 106 is pivoted to the frame of the casing machine and includes an angle guide 107 that normally remains in the position shown in solid lines in FIG. 3. Referring to FIG. 3A, lever 106 is connected to the rod 108 of a piston within cylinder 109, the blank end of which is connected to the frame of the casing machine. Prior to energizing cylinder 99, cylinder 109 is energized to move the lever 106 from its solid line position to its dot-and-dash position (FIG. 3).

As the containers C move in front of the pusher plate 98, the leading two contact a depressible element 110 that may be connected to a dash pot similar to dash pots 59A, 60A. Element 110 actuates a valve B8 (FIG. 1) when the full complement of containers C is in correct position in front of pusher plate 98. As will appear hereinafter, operation of valve B8 will energize a cylinder 111 (FIG. 5) beneath conveyor 65. The cylinder 111 has its blank end pivoted to the frame supporting conveyor 65, and the piston rod 112 of a piston in cylinder 111 is connected to a link 113 pivoted at 114 to the frame. Link 113 supports an arm 115 at its free end and is connected to a drawbar 116 intermediate its ends. The bar 116 extends across and beneath conveyor 65 and is pivoted to a crank 117 having one arm connected to a vertical shaft 118. A link 119 has one of its ends fixed to shaft 118 and its other end supports an arm 120 that cooperates with arm 115 to provide a gate for preventing the feeding of containers C toward the casing machine until after a complete complement adjacent the pusher plate 98 has been cleared by pushing them onto a table 121 (FIG. 3).

The table 121 (FIGS. 2 and 3) is made up of two tray-like plates 122 and 123 mounted on a cross bar 124 that is connected to arms 125 and 126, the upper ends of which are pivoted at 127 and 128 on the frame of the casing machine. A centrally disposed leg 129 is connected to the center of bar 124 at its lower end and pivoted to the caser frame at 130 (FIG. 3). Leg 129 extends above pivot 130 and is connected to a piston rod 131 of a piston within a cylinder 132, the blank end of which is pivotally anchored to the caser frame. Admitting pressure fluid to the rod end of cylinder 132 pivots table 121 from its solid line position to its dotted line position for a purpose to be described later.

The tray-like plates 122, 123 are separated by a wedge-shaped separator 133 located on a dead plate 134 spanning the distance between conveyor 65 and table 121. This spacer separates the complement of containers C in front of plate 98 into two groups, each adapted to fill a case, as will be explained.

The tray-like plates 122, 123 include spacers 135 integral therewith that separate each group of containers on the corresponding plate into three rows of two half-gallon containers each. When quart containers are being handled, the spacers 135 will be changed to separate each group into four rows of three containers each. And, when gallon containers are being handled, spacers 135 will be located so as to divide each group into two rows of two each.

When the containers C fill the trays 122, 123, the leading containers contact a backstop 136. It may include separate horizontal bars 137, 138 (FIG. 2) attached to separate vertical rods 139, 140 on each side of leg 129 so that the latter can pass therebetween.

Rods 139, 140 are fixed to a block 141 mounted for sliding movement on ways 142 on plate 89. Block 141 is connected to a piston rod 143 that reciprocates within a cylinder 144. The backstop bar 137 in its forward position as shown in FIG. 3 stops the bottles C on table 121 in a position relative to gripping heads 145, 146 to be described, such that the gripping means on the heads move the bottles a constant distance for each gripping means in a direction at right angles to the spacing of the bottles by spacers 135. In order to prevent heads 145, 146 from hitting bars 137, 138 when they descend to lower the bottles into cases, the cylinder 144 is activated to move bracket 141 and bars 137, 138 leftwardly (FIG. 3).

Referring to FIGS. 1, 2 and 3, both gripping heads 145, 146 are identical and therefore only head 145 will be described in detail.

Referring to FIGS. 2 and 3, the top platform 85 may support a base 147 having a standard 147' extending upwardly therefrom. A cross bar 148 may be attached to the top of standard 147', and it may have bearings 149 and 150 mounted thereon in vertical alignment, respectively, with bearings 151 and 152 on base 147. Rods 153 and 154 may slidingly extend through bearinsg 149, 151 and 150, 152, respectively, bearing 152 being in the same horizontal plane as bearing 151 on the opposite side of standard 147'.

A cylinder 155R may be fixed to the standard 147' in vertical position, and its piston rod 156 may be connected through a turnbuckle joint 157 to another aligned piston rod 158. Rod 158 extends through a cross plate 159 that is fixedly attached to the upper ends of rods 153, 154 and into a cylinder 160R mounted on plate 159.

The bottoms of rods 153, 154 are tied together by a plate 162 which has fixed to its undersurface spaced bars 163 (FIGS. 2 and 7) of a gripping head 145. Bars 163 have fixed to them another pair of spaced parallel bars 165, 166 which journal parallel spaced rods 167, 168, 169 and 170 (FIG. 7) for oscillatable movement. Each of the rods 167 to 170 has a flexible, elongated plate 171 fixed to it. The lower, free ends of plates 171 on rods 167, 168 have inturned ends 172 facing each other, and the plates 171 on rods 169, 170 have inturned ends 172 facing each other. Referring to FIG. 7, a link 173 is fixed to rod 167 and a similar link 174 is fixed to rod 170. The upper ends of links 173 and 174 are connected to links 175 and 176, which latter include adjustable turnbuckle means 177 and 178. Links 175 and 176 are connected to a bar 179 that is rigidly attached to a piston rod 180 of a piston within a cylinder 181R mounted on the top of a standard 182 that is supported by plate 163.

A link 183 is fixed to rod 168, and a link 184 is fixed to rod 169. Link 183 is connected to link 174 by a link 185, and link 184 is connected to link 173 by a link 186. The construction and arrangement of the parts are such that with the piston within cylinder 181R in its upper position, the resilient plates 171 are separated as shown in FIG. 7. When the piston within cylinder 181R moves downwardly, the plates on rods 169, 170 and those on rods 167, 168 move toward each other to grip the tops of containers C. Plates 186A and 186B are floatingly attached to bars 163 and are at such an elevation as to contact the tops of the containers C when the ends 172 are in correct position to grip the tops of containers C. Screws 163C and 163D slidingly extend through bars 163, and springs 163E and 163F resiliently urge plates 186A and 186B downwardly. These plates 186A and 186B prevent the swaying of the containers C while being supported by the heads 145, 146.

In order to accommodate containers of different heights, the plate 163 supporting gripping head 145 may be fixed to plate 162 through the agency of bolts and spacers (not shown). By locating one or more spacers above or below plate 163, the elevational position of the head 145 can be substantially varied. Additionally, the turnbuckle joint 157 may also provide further adjustment.

The cylinder 160R is designed for limited travel to locate the gripping head 145 in position to become attached to the tops of the containers C, whereas the stroke of the piston within cylinder 155R lowers the containers into a case 187 that is fed into the casing machine along the lower platform 87 on a conveyor to be described later.

With the piston in cylinder 160R at its lowermost position and the piston within cylinder 155R in its uppermost position, admission of pressure fluid at the rod end of cylinder 160R will cause cylinder 160R, plate 159 and rods 153, 154 to descend until the top of cylinder 160R strikes the piston therein. At this point, the resilient plates 171 in their open condition will embrace the tops of the containers C on tray 123.

Figure 13:
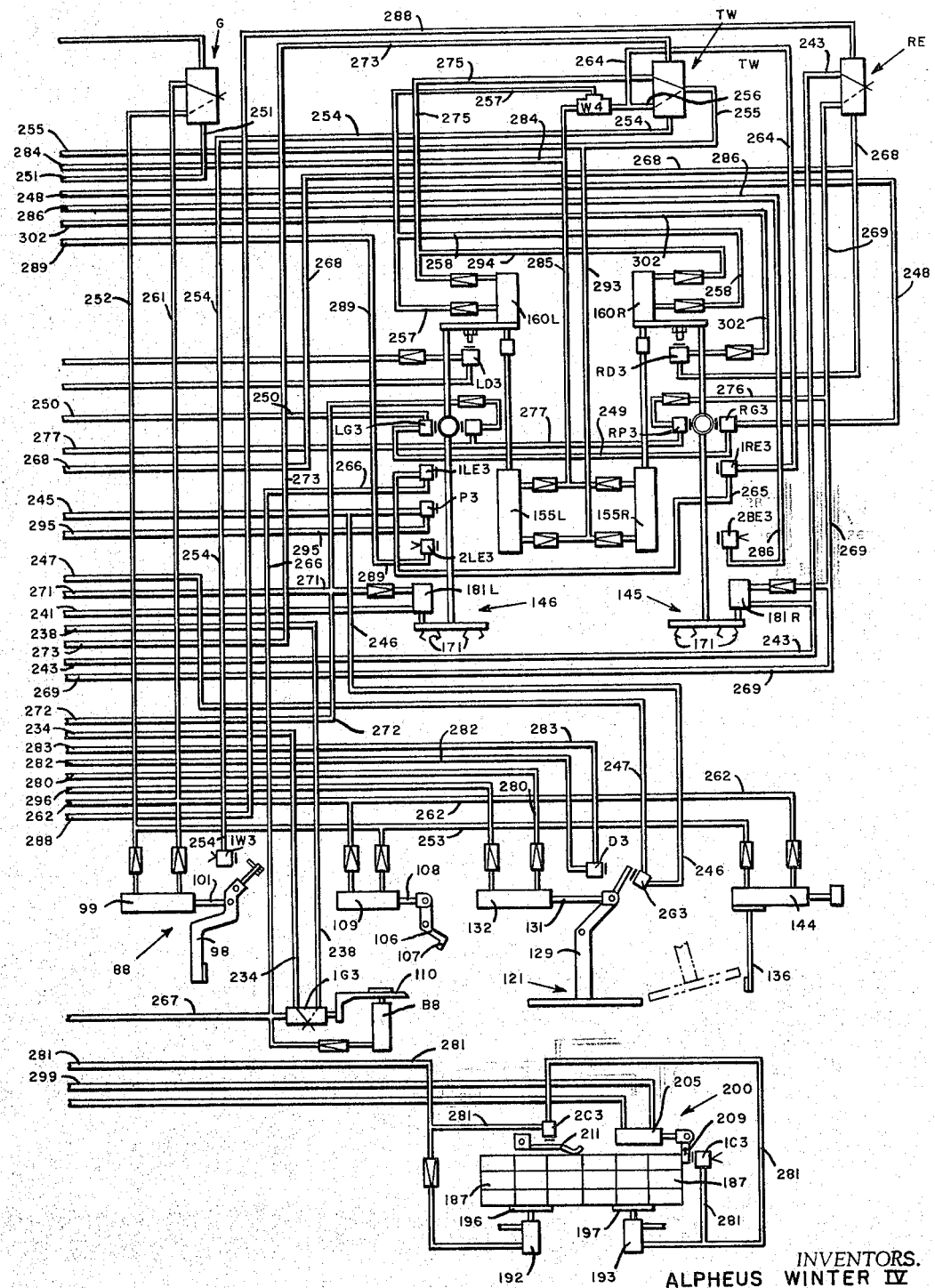

As the head 145 descends, a button on plate 159 actuates a valve 1RE3 (FIG. 13) to supply pressure fluid to the blank end of cylinder 181R, causing the piston therein to descend, operating the linkage 175, 176 to close the plates 171 to grip the tops of the containers C. As will be explained later, the head 145 moves upwardly and pressure fluid is admitted to the rod end of cylinder 132 (FIG. 3), causing leg 129 to move to its dot-and-dash line position, actuating a valve D3 (FIG. 13). Actuation of valve D3 admits pressure fluid to the rod end of cylinder 155R, provided that cases 187 are in their proper location beneath heads 145 and 146. If this condition exists, the heads 145, 146 descend to a point such that the bottoms of the containers C are slightly above the bottom of cases 187.

Referring to FIGS. 3 and 6, the lower platform 87 may support parallel spaced members 188 and 189 between which endless chains form a conveyor for transporting cases 187 to a predetermined location for receiving the containers C.

Referring to FIG. 6, the member 189 may support two spaced cylinders 192, 193, the piston rods 194 and 195 of which are connected to shoes 196, 197 acting on guide means 198, 199 that are attached to member 189. A stop latch mechanism 200 may be mounted on the member 188 for stopping the forward movement of a leading case 187. It may comprise a lever 201 mounted on a pivot pin 202 and including a portion 203 that may be moved into and out of the path of travel of the cases 187.

Another arm 204 of lever 201 may be pivotally connected to the end of a cylinder 205 having a reciprocable piston therein, the piston rod 206 of which is pivotally connected to a bracket 207 that is fixed to the member 188, the bracket 207 also supporting pivot pin 202. Pressure fluid normally is supplied to the blank end of cylinder 205, causing it to move to its extended position, thereby positioning portion 203 of lever 201 in the path of travel of cases 187. A bellcrank lever 208 may be pivotally mounted on lever 201 and it may include an arm 209 that normally lies in the path of travel of cases 187 but spaced slightly angularly from portion 203 when a case 187 is not in contact with it. The angular spacing of 209 and 203 is shown in FIG. 8.

Bellcrank 208 also includes an arm 210 that cooperates with a valve 1C3 (FIG. 13). When a case 187 moves forwardly into contact with arm 209, it forces it against portion 203, thereby positively locating the forward position of case 187. The movement of arm 209 into contact with portion 203 operates valve 1C3, thereby admitting pressure fluid to the blank end of cylinder 193, causing shoe 197 to force case 187 into contact with member 188, thereby positively locating a leading case 187 transversely of conveyor chains 190, 191 and directly beneath head 145.

Referring again to FIG. 6, a lever 211 may be pivoted to a plate 212 fixed to member 188. Lever 211 may include an offset portion 213 that extends through an opening 214 in member 188 and at a distance from the arm 209 when in contact with portion 203, which distance is only slightly greater than the length of a case 187. The lever 211 includes an adjustable screw 215 that actuates a valve 2C3 when in the position shown in FIG. 6, i.e., when a second case 187 is abutting a first case 187, which latter abuts arm 209 and portion 203.

Actuation of valve 2C3 admits pressure fluid to the blank end of cylinder 192, forcing shoe 196 into engagement with the second case 187, forcing it against member 188, and since it abuts the leading case 187, it is properly located beneath the head 146. As will be explained later, the operation of valve 2C3 also supplies pressure fluid to means that initiates the final downward movement of heads 145 and 146.

Figure 12:
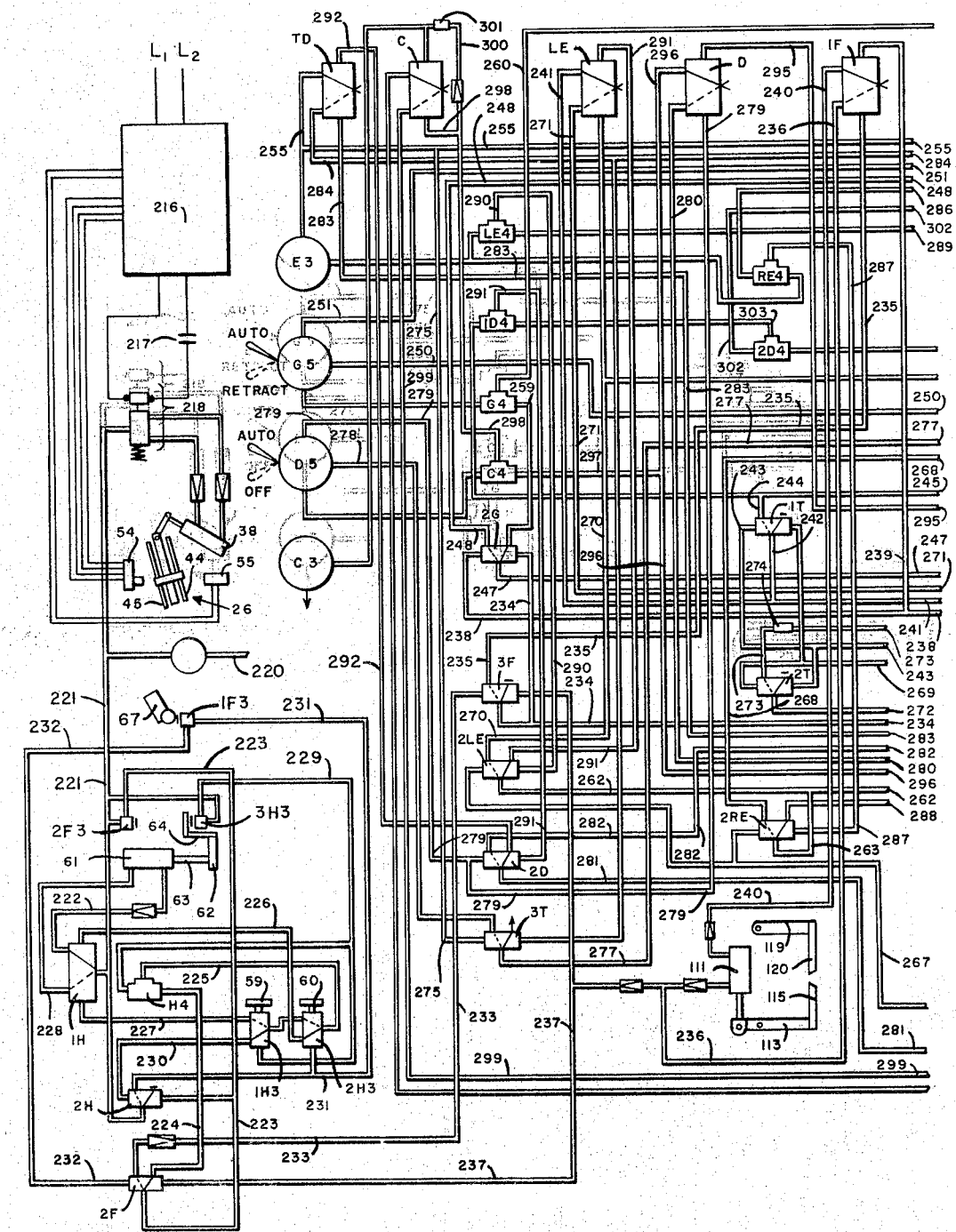
FIGS. 12 and 13 are diagrams of the fluid-operated system of the invention.

Referring to FIGS. 12 and 13, the following will identify the various symbols used.

NUMBERING SYSTEM

Each pneumatic operation is coded with a letter of the alphabet.

| Basic letter: | Principal operation |
|---|---|
| C | Case stop. |
| D | Lowering heads. |
| E | Bottle gripping. |
| F | Accumulator. |
| G | Main pusher. |
| H | Infeed pusher. |
| P | Swinging table. |
| S | Alternating separator. |
| W | Auxiliary lowering. |

Each pneumatic component is coded with a number following the basic letter. The supply valves are designated by the basic letter only. The letter A is used as an example in the following list.

| Basic letter and number: | Component |
|---|---|
| A | Supply valve. |
| A1 | Cylinder. |
| A2 | Flow control. |
| A3 | Button or stem valve. |
| A4 | Shuttle valve. |
| A5 | Quick exhaust. |
| A6 | Toggle switch. |
| A7 | Check valve. |
| A8 | Shock absorber. |

The presence of a number before a letter shows there is more than one similar component in a particular operation. For example, 3D4 means that there are at least three shuttle valves in the lowering head operation. The first two would be numbered 1D4 and 2D4.

The letter R preceding another letter denotes an operation in the right side lowering system, and the letter L denotes an operation in the left side lowering system. Right and left are determined by facing the manual panel in front of the case conveyor. For example, RD means right lowering head supply valve; RD1 means right lowering head cylinder, etc.

The numerical numbering of the air lines, 1, 2, 3, etc., determines the starting and ending points of the lines in the schematic diagram and the corresponding lines in the caser. All lines with identical numbers 1, 1, 1, etc., are common to each other and are served by the same air supply. Air in one means air in all marked with the same number.

SYMBOLS

Certain symbols are used in the schematic to designate valves, cylinders, connections, etc. A listing of these symbols follows.

| Symbol | Code | Component | Description |
|---|---|---|---|
| (arrow symbol) | | | Air supply from manifold. |
| (4-way valve symbol with Signal #2, Outlet #2 #1, Supply, Signal #1) | A | Supply Valve, 4-Way. | Air supply enters at middle of valve and passes through either solid or dotted line to outlet. The outlet which will direct the flow of air is determined by the actuation of the right or left cap by an air signal. Only one outlet is opened at a time and only one signal can work at one time. The outlet nearest the cap being signalled is the one through which the air supply is directed. Outlet #1 is opened by Signal #2, etc. The solid line denotes air direction in normal starting or reset position of caser operation being controlled by valve. The solid line outlet may be plugged to make a 3-way valve. The dotted line denotes air direction in activated position of caser operation being controlled by valve. |

| Symbol | Code | Component | Description |
|---|---|---|---|
| Blank End  Rod End  Extend  Retract 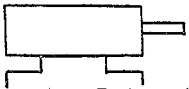 | A1 | Cylinder, Double Acting. | Air enters either blank end or rod end. Blank end extends piston rod and rod end returns piston rod. Motion of piston rod transfers movement to caser operation. |
| ← Free Flow  Controlled Flow → 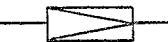 | A2 | Flow Control | Controlled air enters V opening and leaves through point of V. Free flow of air enters point of V and leaves through opening of V. Controlled air is used to delay shifting of a valve, or is used to slow down cylinder movement. It thus becomes a timer or a speed control by application. It may control the supply to, or the exhaust from a valve or cylinder. |
| In  Out 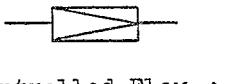 | A3 | Button Valve, Spring return. | Air supply enters rear valve port and leaves through side port when button is engaged on normally closed NC valves by manual or mechanical actuation. |
| Reset  Supply 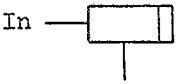 | A3 | Button Valve, Air return. | Air supply enters point of V and leaves through outlets similar to Valve A style. Manual or mechanical push on valve stem opens dotted line. Air reset to end cap opens solid line. Only one line is opened at a time. |
| In -- In  Out 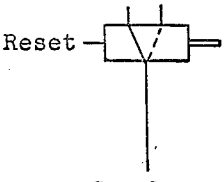 | A4 | Shuttle Valve | Air enters either inlet and leaves through outlet. Air may enter only one inlet at a time. Air does not pass from inlet to inlet. Exhaust air in outlet line may pass in reverse through original inlet. |
| Exhaust  Cylinder  Supply 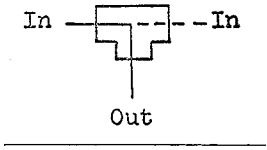 | A5 | Quick Exhaust | Air enters supply inlet and leaves from cylinder end to operate cylinder. When cylinder is shifted in opposite direction, exhaust air enters cylinder end and dumps out exhaust outlet. This allows quick movement of cylinder in opposite direction. |
| Out  Out  In 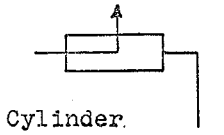 | A6 | Toggle Switch | Manual operation of bat handle shifts valve ON-OFF or OFF-ON. Supply may pass through to one outlet only, or to two outlets providing selective supply to two separate components. |
| Free Flow ←  No Flow → 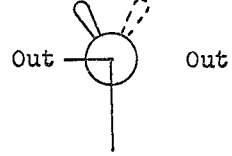 | A7 | Check Valve | Air enters inlet point of V and leaves through opening in V. This is the only direction for air flow. Air coming to opposite side of inlet is checked by ball seat in valve. |
| Supply  | A8 | Shock Absorber, Single Acting. | A basic single acting cylinder, air momentarily enters inlet end of cylinder and resets piston rod. Operation of piston rod by load compresses air in piston chamber, which has a controlled exhaust. |

Referring to FIGS. 12 and 13, each time a bottle passes through the gate 26, photocell 54, 55 is activated. This energizes an indexing means within box 216, and after a predetermined number of such indexes, energizes a relay that closes contacts 217. A spring biased solenoid valve 218 is alternately energized and de-energized after a predetermined number of bottles passes through gate 26. This alternately supplies air to opposite ends of cylinder 38 so as alternately to oscillate gate 26. From the foregoing, the oscillation of gate 26 alternately supplied a predetermined number of bottles (three in the embodiment disclosed) to conveyor belts 24 and 25 as shown in FIG. 9. Initially, belt 24 is supplied with bottles and then belt 25. This permits the bottles on belt 24 to be located against infeed pusher 62 forming a wall along which the bottles from conveyor 25 pass.

Pressure fluid from a supply line 220 passes through a line 221, thence through a valve 1H and a line 222 to the rod end of cylinder 61, maintaining pusher plate 62 in its retracted position (FIG. 4). Valve 1H is held in this position by pressure fluid from line 221 passing valve 2F3 (with 62 retracted) to a line 223 to valve 2F, thence through a line 224 to valve H4, thence through line 225, valve 2H3, a line 226 to valve 1H, holding it in position to pass supply pressure fluid to the rod end of cylinder 61.

When actuators 59, 60 are depressed by bottles on conveyors 24, 25, pressure fluid passes from line 225 through valves 2H3 and 1H3, line 227 acting on valve 1H, causing pressure fluid from line 221 to pass valve 1H, thence through line 228 to the blank end of cylinder 61 extending pusher plate 62 and forcing the bottles in front of it onto conveyor 65. At the forward end of extended travel of pusher plate 62, valve 3H3 is actuated. This allows pressure fluid to flow past 3H3, through line 29 acting on valve 1H3, resetting it so that pressure fluid now flows from line 225, through valves 2H3, 1H3, line 230, acting on valve 2H. Supply pressure fluid then flows from 221 through valve 2H, line 231 to valve 1F3, resetting valve 2H3.

The reciprocation of pusher plate 62 is repeated until enough bottles have been transferred to conveyor 65 which will fill one or more cases, depending upon the number of heads employed in the caser. These bottles are held against the gate 115, 120 which at this time is closed. Each reciprocation of pusher plate 62 indexes ratchet wheel 69 so that when the case loads have accumulated on conveyor 65 with gate 115, 120 closed, valve 1F3 is actuated, passing pressure fluid from line 231 to line 232 acting on valve 2F. This causes pressure fluid to flow from 223 through valve 2F, line 233 acting on valve 3F.

With the element 110 not depressed because no bottles are against it, valve 1G3 passes supply fluid through line 234 so that when valve 3F is actuated by fluid in 233, pressure fluid from 234 passes 3F to line 235 acting on valve 1F, causing supply pressure fluid to flow through line 236 to the rod end of cylinder 111, opening gate 115, 120 to pass the case or case loads of bottles. Also, pressure fluid in line 236 flows through line 237 acting on valve 2F so that with pusher plate 62 retracted and valve 2F3 open, pressure fluid passes valve 2F to line 224, valve H4, line 225, valves 2H3, 1H3, line 227, acting on valve 1H so that supply fluid passes valve 1H to line 228 to the blank end of cylinder 61, restarting the reciprocation of pusher plate 62.

As the group of bottles moves forwardly to the caser after gate 115, 120 opens, it hits and depresses element 110. This actuates valve 1G3, causing supply fluid to flow through line 238, line 239 actuating valve 1F so that supply fluid passes valve 1F through line 240, acting on the blank end of cylinder 111, closing gate 115, 120.

Since the jaws or grippers 171 are open, supply pressure fluid flows through valve LE, thence through lines 241, 242 and valve 1T. However, supply fluid flows through valve RE, line 243 acting on valve 1T so that pressure fluid flows from line 242 to lines 244, 245, 246 through valve 2G3 since it is open with table 121 closed, thense through line 247. Since pressure fluid in 238 acts on valve 2G, fluid from line 247 passes valve 2G into line 248 leading to RG3 valve which is open with the heads up, thence through line 249, valve LG3, line 250 providing the supply for valve G5 which passes it to line 251, causing it to act on valve G. Accordingly, supply fluid passes valve G to line 252 that is connected to the blank end of cylinder 99, turning pusher plate 98 counterclockwise to push the load of bottles onto table 121.

Simultatneously with cylinder 99 being supplied with pressure fluid, the same flows through line 253, acting on the rod end of cylinder 109, removing the bottle guide 107. Also, pressure fluid flows through line 253 to cylinder 144, setting backstop 136 to limit the forward motion of the bottles onto table 121.

With pusher plate 98 in its forward position, valve 1W3 is actuated, passing supply pressure fluid to line 254, acting on valve TW so that supply pressure fluid from valve TD passing through line 255 passes valve TW to line 256, thence through valve W4, line 257 and line 258 to cylinders 160L and 160R. This lowers the heads 145 and 146 to a position with open grippers 171 encasing the tops of the bottles on table 121 and with plates 186A, 186B contacting the tops of containers C.

With pusher plate 98 forward, there are no bottles against element 110 and consequently valve 1G3 is in position to pass supply pressure fluid through valve 1G3, line 234, acting on valve 2G.

Since the jaws 171 of head 145 are open at this point, valve RE passes supply pressure fluid to line 243, acting on valve 1T. Also, since jaws 171 of head 146 are open, valve LE passes supply pressure fluid to lines 241 and 242. Accordingly, pressure fluid from 242 passes valve 1T to lines 244, 245, 246, valve 2G3, line 247 to valve 2G. Since, as above explained, there is pressure fluid in line 234 from 1G3, pressure fluid passes valve 2G to line 259, valve G4, line 260, acting on valve G. This causes supply pressure fluid to flow through valve G to line 261 to the rod end of cylinder 99, returning pusher plate 98 to the position shown in FIG. 13.

Pressure fluid in line 261 flows through line 262 to the rod end of cylinder 144, retracting backstop 136 so that it will not interfere with the heads 145, 146 when they descend. Pressure fluid in line 261 also flows through lines 262 and 263 to valve 2RE. Pressure fluid in line 262 also acts on 109 to reset 107.

Because the heads 145, 146 are lowered by the action of cylinders 160R and 160L, pressure fluid is present in line 254, causing pressure fluid in line 255 to pass valve TW to lines 256, 264. Also, with heads 145, 146 in the gripping elevation, valves 1RE3 and 1LE3 are open, passing pressure fluid to lines 265, 266, 267, acting on valve 2RE so that the pressure fluid in line 263 passes valve 2RE to line 268, acting on valve RE to pass supply pressure fluid to line 269, thence to cylinder 181R, causing plates 171 on head 145 to grip the bottles for head 145. Likewise, since pressure fluid in line 267 acts on valve 2LE, pressure fluid in line 262 is caused to pass valve 2LE into line 270, acting on valve LE, passing supply pressure fluid to line 271 leading to cylinder 181L, closing grippers 171 on head 146.

Since grippers 171 are closed, there is pressure fluid in line 269 acting on valve 2T to pass pressure fluid in lines 271 and 272 to line 273 having a time delay restriction 274 therein. Accordingly, valve TW is acted upon to pass supply pressure fluid to line 275, acting on the blank ends of cylinders 160L and 160R, effecting the raising of heads 145, 146 by these auxiliary cylinders 160L, 160R. The time delay restriction 274 provides time to ensure the gripping of containers C before heads 145, 146 rise.

Since the heads 145, 146 are at their upper positions, there is supply pressure fluid in line 255 and it flows through line 275, acting on valve 3T. Since the grippers 171 are closed, pressure fluid in 269 branches off in line 276, passes valve RP3 into line 277 to valve 3T, thence to line 278, through valve D5 to line 279, acting on valve P so that supply pressure fluid flows through line 280 to the rod end of cylinder 132, pivoting table 121 to its dotted line position from beneath the raised gripped bottles in heads 145, 146.

With two cases 187 in proper position beneath heads 145, 146, valves 1C3 and 2C3 are open so that supply pressure fluid flows through line 281, supply valve 2D. Since table 121 is open, pressure fluid in line 279 acts on valve 2D to pass pressure fluid from line 281 through valve 2D to line 282 to valve D3, and since the latter valve is open by virtue of table 121 being open, pressure fluid passes valve D3 to line 283, acting on valve TD. This causes supply pressure fluid to flow through line 284 to valve W4, thence through line 257 to cylinder 160L. It also passes through 258 to cylinder 160R. This arrangement causes lowering of the heads 145, 146 through the auxiliary cylinders 160R and 160L without having air in line 254 to act on valve TW. Accordingly, valve TW remains in its solid line condition, air being in line 273. The pressure fluid in line 284 branches through line 285 that leads to the rod ends of cylinders 155L and 155R. Thus, the heads 145, 146 move downwardly due not only to the auxiliary cylinders 160R and 160L but also due to the main lowering cylinders 155L and 155R.

With pusher plate 98 in its retracted position, there is pressure fluid in line 261. This supplies line 262 and valve 2RE. When head 145 reaches its lowest position with the bottles in the case 187, valve 2RE3 opens, supplying pressure fluid to line 286, thence through valve RE4, line 287, acting on valve 2RE so that pressure fluid from line 263 passes valve 2RE to line 288, acting on valve RE so that supply pressure fluid flows through line 243 to the rod end of cylinder 181R, opening grippers 171 of head 145.

When head 146 reaches its lowest point, valve 2LE3 is opened so that supply pressure fluid flows past it to line 289, through valve LE4, line 290, acting on valve 2LE to pass pressure fluid from line 262 (supplied from 261 since pusher plate 98 is retracted) to line 291, acting on valve LE to pass supply pressure fluid to line 241 leading to cylinder 181L, opening the grippers 171 on head 146.

Since the grippers on the heads 145, 146 are now open, there is pressure fluid in lines 243 from RE and in line 241 from LE. Accordingly, valve 1T passes pressure fluid from line 242 to lines 244, 245, valve 1D4, line 291, acting on valve 2D to pass pressure fluid from line 281 (from 2C3 and 1C3) to line 292, acting on valve TD to pass supply pressure fluid to line 255, branch 293 leading to the blank ends of cylinders 155L and 155R, causing heads 145, 146 to rise.

It will be remembered that valve TW is still in its solid line condition since it was not used for the last lowering of the heads 145, 146 by cylinders 160L and 160R. Therefore, since there is pressures fluid in line 255 after the actuation of valve TD, pressure fluid is supplied to lines 275 and 294 leading to the blank ends of cylinders 160R and 160L to cause them to raise heads 145, 146 also.

Since the grippers 171 are open, there is pressure fluid in lines 243 and 242. Therefore, the pressure fluid in line 242 passes valve 1T to lines 244, 245, to valve P3. As the head rises, P3 is open, passing pressure fluid from line 245 to line 295, acting on valve D so that supply pressure fluid flows through line 296 connected to the blank end of cylinder 132, returning table 121 to its solid line or closed position.

Since there is pressure fluid in line 296 causing closing of table 121, there also is pressure fluid in a branch 297 leading to valve C4 from which it flows through line 298, acting on valve C to pass supply pressure fluid through line 299 to the rod end of cylinder 205, withdrawing stop 209 from in front of the leading case 187. This closes valve 1C3 to release shoes 196, 197 so that the two cases proceed along the conveyer 190, 191. There is a branch 300 leading from line 298 to the valve C, and it includes a time delay restriction 301. This permits resetting of stop 209 after the two cases 187 pass and adjustment thereof to stop the first case following the trailing filled one.

The apparatus is then in condition to pass through the same cycle as just explained. In the event that there is a defective case, valve RD3 is opened. Since the grippers are closed, there is pressure fluid in line 268 and it passes valve RD3 to line 302, to valve 2D4, line 303 to valve 1D4, line 291, actuating valve 2D. Pressure fluid in line 281 passes valve 2D into line 292, acting on valve TD to raise head 145.

When the head 145 reaches its top position, it opens valve RP3 and since the grippers are still closed, pressure fluid in line 276 passes valve RP3 into line 277 that supplies valve 3T. However, pressure fluid in line 275 causes pressure fluid in line 277 to pass valve 3T to line 278, through valve D5 to line 279, acting on valve 2D so that pressure fluid in line 281 flows into line 282, past open valve D3 (table 121 being open) into line 283, acting on valve TD to pass pressure fluid to line 284, thence to valve W4 and line 257 as well as to branch 285 to cylinders 155L and 155R, thereby starting heads 145, 146 downward again. In the above description only the circuitry for head 145 was traced; however, head 146 moves with it.

This up and down movement of heads 145, 146 continues until the case receives the bottles, and in the event it continues for several reciprocations, the operator stops the operation, as explained later, replaces the defective case, and restarts the operation so as to complete the cycle.

Several manually operable valves are provided. Thus, valve E5 when actuated effects opening of the gripper jaws 171 of heads 145, 146. Valve G5 when in the "Auto" position connects lines 250 and 251, and in "Retract" position connects line 250 to valve G4.

The valve D5 in "Auto" position acts to effect the lowering of heads 145, 146. However, when one or both of the heads have been prevented from lowering because of a defective case and have repeated their up and down movements as previously described, the operator turns the toggle of valve D5 to "Off" position, whereupon the defective case is released and is replaced by the next succeeding case or cases. Then upon return of the toggle of valve D5 to "Auto," the cycle repeats and is completed if the new case or cases are proper.

Although the various features of the improved caser apparatus have been shown and described in detail to fully disclose one embodiment of the invention, it will be evident that changes may be made in such details and certain features may be used without others without departing from the principles of the invention.

What is claimed is.

1. Apparatus adapted to be supplied with containers from a single line conveyor comprising in combination, a multi-line conveyor adapted to be supplied with containers from said single line conveyor, said multi-line conveyor having its trailing end in line with the leading end of said single line conveyor; oscillatable gate means at the junction of said conveyors; means responsive to the movement of containers through said gate means for causing said gate means to direct a predetermined number of containers alternately to each of the lines of said multi-line conveyor; and reciprocally movable means connected to said gate means moving with the containers during oscillation of said gate for preventing the turning of said containers about their vertical axes while being directed to each line of said multi-line conveyor and while continuously moving.

2. Apparatus adapted to be supplied with containers from a single line conveyor comprising in combination, a multi-line conveyor adapted to be supplied with containers from said single line conveyor, said multi-line conveyor having its trailing end in line with the leading end of said single line conveyor; gate means at the junction of said conveyors; means responsive to the movement of containers through said gate means for causing said gate means to direct a predetermined number of containers alternately to each of the lines of said multi-line conveyor; and telescoping means connected to said gate means for preventing the turning of said containers about their vertical axes while being directed to each line of said multi-line conveyor and while continuously moving.

3. Apparatus adapted to be supplied with containers from a single line conveyor comprising in combination, a multi-line conveyor adapted to be supplied with containers from said single line conveyor, said multi-line conveyor having its trailing end in line with the leading end of said single line conveyor; oscillatable gate means at the junction of said conveyors; means responsive to the movement of containers through said gate means for causing said gate means to direct a predetermined number of containers alternately to each of the lines of said multi-line conveyor; and cam-operated reciprocally movable means connected to said gate means moving with the containers during oscillation of said gate for preventing the turning of said containers about their vertical axes while being directed to each line of said multi-line conveyor and while continuously moving.

4. Apparatus adapted to be supplied with containers from a single line conveyor comprising in combination, a multi-line conveyor adapted to be supplied with containers from said single line conveyor, said multi-line conveyor having its trailing end in line with the leading end of said single line conveyor; gate means at the junction of said conveyors; means responsive to the movement of containers through said gate means for causing said gate means to direct a predetermined number of containers alternately to each of the lines of said multi-line conveyor; and cam-operated telescoping means connected to said gate means for preventing the turning of said containers about their vertical axes while being directed to each line of said multi-line conveyor and while continuously moving.

5. Apparatus adapted to be supplied with containers from a single line conveyor comprising in combination, a multi-line conveyor adapted to be supplied with containers from said single line conveyor, said multi-line conveyor having its trailing end in line with the leading end of said single line conveyor; gate means at the junction of said conveyors; photocell means responsive to the movement of containers through said gate means for causing said gate means to direct a predetermined number of containers alternately to each of the lines of said multi-line conveyor; and telescoping means connected to said gate means for preventing the turning of said containers about their vertical axes while being directed to each line of said multi-line conveyor and while continuously moving.

6. Apparatus adapted to be supplied with containers from a single line conveyor comprising in combination, a multi-line conveyor adapted to be supplied with containers from said single line conveyor, said multi-line conveyor having its trailing end in line with the leading end of said single line conveyor; gate means at the junction of said conveyors; means responsive to the movement of containers through said gate means for causing said gate means to direct a predetermined number of containers alternately to each of the lines of said multi-line conveyor; a crank connected to said gate means; fluid-operated means for oscillating said crank means to thereby oscillate said gate means; telescopingly mounted extensions on the leading end of said gate means; and cam means for extending said telescoping extensions as said gate means passes the medial point of said multi-line conveyor, and for retracting said telescoping extensions at the opposite sides of said multi-line conveyor and while continuously moving.

References Cited by the Examiner

UNITED STATES PATENTS

| | | | |
|---|---|---|---|
| 2,318,221 | 5/1943 | Hayssen | 198—31 |
| 2,627,334 | 2/1953 | Koppel | 198—31 |
| 2,656,081 | 10/1953 | Davis | 53—247 |
| 2,713,448 | 7/1955 | Wimmer | 53—247 |
| 2,827,150 | 3/1958 | Eaton | 198—31 |
| 2,941,650 | 6/1960 | Clinton | 198—30 |
| 3,100,038 | 8/1963 | Jones | 198—30 |
| 3,193,078 | 7/1965 | Amenta | 198—31 |

EVON C. BLUNK, *Primary Examiner.*

EDWARD A. SROKA, *Examiner.*